US008640729B2

(12) United States Patent
Dana (10) Patent No.: US 8,640,729 B2
(45) Date of Patent: Feb. 4, 2014

(54) METHOD AND APPARATUS FOR AUTOMATIC FLUID SHUT-OFF

(76) Inventor: Brian Dana, Corunna, MI (US)

( * ) Notice: Subject to any disclaimer, the term of this patent is extended or adjusted under 35 U.S.C. 154(b) by 220 days.

(21) Appl. No.: 13/327,579

(22) Filed: Dec. 15, 2011

(65) Prior Publication Data

US 2012/0153195 A1 Jun. 21, 2012

Related U.S. Application Data (60) Provisional application No. 61/423,172, filed on Dec. 15, 2010.

(51) Int. Cl.
  *F16K 17/20* (2006.01)
(52) U.S. Cl.
  USPC ............. 137/460; 137/463; 137/486; 137/99; 251/67; 251/73; 251/74
(58) Field of Classification Search
  USPC ........... 137/486, 460, 463, 99; 251/67, 73, 74
  See application file for complete search history.

(56) References Cited

U.S. PATENT DOCUMENTS

| | | | | |
|---|---|---|---|---|
| 1,677,729 A | * | 7/1928 | Sams | 137/463 |
| 1,726,082 A | * | 8/1929 | McLaughlin et al. | 137/99 |
| 1,726,083 A | * | 8/1929 | McLaughlin et al. | 137/99 |
| 2,012,351 A | | 8/1935 | Riney et al. | |
| 2,439,117 A | * | 4/1948 | Waterman | 137/220 |
| 2,439,118 A | * | 4/1948 | Waterman | 137/220 |
| 2,626,633 A | * | 1/1953 | Wilson | 137/601.13 |
| 3,279,496 A | * | 10/1966 | Klass et al. | 137/487.5 |
| 3,434,493 A | * | 3/1969 | Owens | 137/460 |
| 3,465,649 A | | 9/1969 | Eggers et al. | |
| 3,549,048 A | * | 12/1970 | Goodman | 222/57 |
| 3,921,667 A | | 11/1975 | Corliss et al. | |
| 4,003,402 A | | 1/1977 | Corliss et al. | |
| 4,180,088 A | | 12/1979 | Mallet | |
| 4,192,344 A | * | 3/1980 | Masuya et al. | 137/489.3 |
| 4,457,334 A | * | 7/1984 | Becker et al. | 137/461 |
| 4,482,081 A | | 11/1984 | Meggs | |
| 4,546,660 A | | 10/1985 | Bujold | |
| 4,586,435 A | | 5/1986 | Aldrich | |
| 4,708,264 A | * | 11/1987 | Bruninga | 222/20 |
| 4,735,231 A | | 4/1988 | Jacquet | |
| 4,821,759 A | | 4/1989 | Diamond | |
| 4,838,310 A | * | 6/1989 | Scott et al. | 137/624.14 |
| 4,880,030 A | | 11/1989 | Terry | |
| 4,913,190 A | | 4/1990 | Kugler | |

(Continued)

*Primary Examiner* — John Rivell
*Assistant Examiner* — Minh Le
(74) *Attorney, Agent, or Firm* — Paparella & Associates, PC; Joseph A. Paparella (57) ABSTRACT

An automatic shut-off valve shuts off fluid flow in the event of abnormal amounts of fluid flow. A rotor inside the valve turns when fluid flows through the valve. The rotor causes a pneumatic pump to operate and cause increased air pressure. The increased air pressure causes a shut-off piston to move to a closed position when a predetermined air pressure is achieved. The shut-off valve also includes an adjustable bleeder needle to slowly bleed off air pressure when the fluid flow stops and thereby resets the valve. A detent is provided for holding the shut-off piston in the open position. A detent spring and compression bolt are provided for adjusting force on the detent. The shut-off valve is manually closed using a trip arm connected to the detent. The shut-off piston is reset by actuating a reset plunger that moves the piston back to the open position.

37 Claims, 6 Drawing Sheets

(56) References Cited

U.S. PATENT DOCUMENTS

| | | | |
|---|---|---|---|
| 4,916,762 A * | 4/1990 | Shaw | 4/366 |
| 5,004,014 A | 4/1991 | Bender | |
| 5,007,453 A * | 4/1991 | Berkowitz et al. | 137/458 |
| 5,044,394 A * | 9/1991 | Brombach | 137/486 |
| 5,056,554 A | 10/1991 | White | |
| 5,251,653 A | 10/1993 | Tucker et al. | |
| 5,427,350 A * | 6/1995 | Rinkewich | 251/30.01 |
| 5,441,070 A | 8/1995 | Thompson | |
| 5,568,825 A | 10/1996 | Faulk | |
| 5,782,263 A * | 7/1998 | Isaacson et al. | 137/487.5 |
| 5,971,011 A * | 10/1999 | Price | 137/460 |
| 5,979,493 A | 11/1999 | Simpkins, Jr. | |
| 6,178,569 B1 | 1/2001 | Quintana | |
| 6,367,096 B1 | 4/2002 | Quintana | |
| 6,671,893 B1 | 1/2004 | Quintana et al. | |
| 6,837,271 B1 * | 1/2005 | Saint | 137/624.12 |
| 6,962,318 B1 | 11/2005 | Nugent | |
| 7,252,113 B2 | 8/2007 | Jacobs et al. | |
| 7,451,777 B2 * | 11/2008 | Burlage et al. | 137/1 |
| 7,509,973 B1 * | 3/2009 | Deive | 137/389 |
| 7,779,852 B2 * | 8/2010 | Burlage et al. | 137/1 |
| 8,113,232 B1 * | 2/2012 | Tallman | 137/460 |
| 2005/0022873 A1 * | 2/2005 | Zeng | 137/460 |

* cited by examiner

METHOD AND APPARATUS FOR AUTOMATIC FLUID SHUT-OFF

This applications is based upon and claims the benefit of priority from Provisional Application No. 61/423,172, entitled Automatic Water Shut-Off Valve, filed Dec. 15, 2010, the entire contents of which are incorporated herein by reference.

BACKGROUND OF THE INVENTION

The present invention relates primarily to fluid shut-off valves and the like. More specifically, the present invention relates to a method and apparatus for automatically shutting off fluid flow in a supply line when an abnormal amount of fluid flows through the supply line over a period of time. The invention is particularly useful in automatically shutting off fluid flow when a machine, hose, or pipe malfunctions or breaks. The invention responds to the excessive fluid flow by stopping fluid flow and thereby limits damage.

Homes, offices, factories and business have many appliances, machines, devices, and pipes that require the flow of fluids. For example, in homes and offices there are many devices that use water. These devices include sinks, toilets, sprinkler systems, water heaters, drinking fountains, coffee makers, and the like. Similarly, factories and businesses have an even greater variety of devices that rely on a water or fluid supply. In addition to devices that rely on a water supply, there are many devices that rely on other fluids such as gas, oil, fertilizers, insecticides, chemicals, and the like. The prior art teaches many ways to control and distribute fluids yet the problem of leaks remains.

Fluid leaks continue to be a major problem. Every year many millions of dollars in damage is caused from leaking pipes, machines, and devices. In a home even a small water leak can cause thousands of dollars in damage if it is not stopped quickly. When a homeowner is gone on vacation or if a vacation cabin is left unattended for weeks or months, even a small water leak can cause substantial damage. If the water leak is large, significant damage can be caused in a short amount of time. In a home it is not uncommon for leaks to occur in toilets, washing machines, dishwashers, pipes, and hoses. Factories and business face these problems and more.

Factories and businesses face additional leak problems since they use a wide variety of fluids and machines. They also use larger volumes of fluids that can cause more damage in less time. The fluid used in factories may also be more dangerous. The variety of fluids used in factories and businesses is numerous and includes chemicals, drugs, and petroleum products to name a few. The cost of the lost fluid itself can be substantial but the damage to facilities and human safety can be even greater.

Finally, another problem relates to power. Some solutions in the prior art rely on electrical power to operate an automatic shut-off device. These devices may work when there is a functioning power supply, but may not work well when the electrical power fails. When the power supply fails, the device maybe designed to automatically shut off. This may require resetting the device whenever there is a power interruption and may cause a loss of production, inconvenience, or the like. Some devices overcome this problem by having self contained electronics and power sources. These devices still require a change of batteries and also become non-functional if the electrical components fail. This also causes inconvenience, loss of production, and the like.

With concerns about fluid leaks many people and organizations are willing to spend hundreds or even thousands of dollars on solutions to this problem. Current solutions include fluid detectors, various automatic shut-off valves, sump pumps, or even hired staff to detect and report leaks. It is therefore advantageous to provide improved solutions to this problem.

Accordingly, a need exists for a new automatic shut-off valve and method that provides an alternative solution to the fluid leak problem. There exists a need for a solution that can be easily adapted to existing fluid/water systems and implemented in future systems. Further, there exists a need for a simple, stand alone, solution that can be scaled to work in the home, business, and industry. Finally, there exists a need for a solution that does not rely on electric power, batteries, or electronic circuits. Such an apparatus would reduce damage, reduce costs, improve safety, and enhance the state of mind of home owners and business owners that worry about fluid leaks. Therefore, an improved automatic fluid shut-off valve and method that provides the aforementioned advantages is desired.

SUMMARY OF THE PRESENT INVENTION

The aforementioned drawbacks and disadvantages of the prior automatic shut-off devices have been identified and a solution is set forth herein by an inventive automatic fluid shut-off valve and method which comprises a valve with a fluid flow powered pneumatic pump activating a shut-off piston. The preferred embodiment uses a rotor inside the valve that rotates when fluid flows through the valve. The rotor is then coupled to the pneumatic pump. The preferred embodiment uses magnetic coupling between the rotor and pump. The new shut-off valve does not rely on electrical connections, batteries, or electronic circuits. It is easily adapted to most fluid delivery systems, is low cost, and operates with fluid flow in either direction.

The preferred embodiment operates as follows. The invention is a valve that connects to a fluid supply line and shuts off fluid flow when excessive fluid flow occurs over a period of time. As fluid flows through the shut-off valve it turns a rotor. The rotor imparts rotational motion to a cam which causes reciprocal motion in a pump arm. The pump arm actuates a bellows that flexes and creates air/gas pressure in the closed system. The air/gas pressure is in fluid communication with a shut-off piston. The shut-off piston is held open by a detent exerting force on the piston. As fluid continues to flow through the shut-off valve, the pump continues to operate and the air/gas pressure increases. When the air/gas pressure on the piston becomes sufficient to overcome the resistance of the detent, the piston moves to the closed position and fluid flow through the valve is stopped.

The preferred embodiment includes a magnetic coupling between the rotor and the cam. At least one magnet is attached to the rotor and at least one magnet is also attached to the cam. The magnets are coupled such that when the rotor is turning, the magnets cause the cam to also turn. The magnets are physically separated from one another through the wall of the valve body. This design reduces the need for seals and the like and prevents fluid from leaking from the rotor to the cam and pneumatic pump assemblies. This embodiment therefore has an advantage of lower malfunction risk due to corrosion and the like. However, it is envisioned that a mechanical link between the rotor and cam would be an alternate embodiment.

One feature of the present invention is the pneumatic pump. The pneumatic pump creates air/gas pressure that operates other parts of the valve. Using the simple pneumatic pump allows the invention to function without the need for electricity, batteries, or electronics of any kind. The combination of air/gas pressure and mechanical resistance also allows the invention to be adjusted by a user or preset by the manufacturer. These adjustments are discussed below. In operation, air/gas pressure increases as the pneumatic pump operates responsive to fluid flow through the shut-off valve. If fluid flow is excessive the air/gas pressure will increase to a level that will overcome the detent and cause the shut-off piston to close. The inventive and simple design reduces cost and reduces the risk of malfunctions.

Another feature of the present invention is a bleed system. The air/gas bleeder allows air/gas pressure to slowly bleed off over time. This amounts to an automatic reset of the shut-off valve when fluid flow stops. It operates as follows. When a machine (e.g. a washing machine) begins to fill with water, water flows through the shut-off valve. The rotor turns and the pneumatic pump begins pumping causing air/gas pressure to increase. When the machine is full the water demand stops and the pneumatic pump stops. However, the air/gas pressure needs to be released to put the shut-off valve back to an initial or reset state. The bleeder feature accomplishes this task by having an adjustable bleeder needle to slowly release the air/gas pressure. Alternate embodiments can have a fixed bleeder system to slowly release air/gas pressure. A user can thereby adjust the bleeder needle as desired. If the bleeder needle allows air/gas to be vented too quickly, the pressure is released faster and thereby resets the shut-off valve more quickly. Conversely, if air/gas is vented too slowly the pressure is released more slowly and thereby it will take a longer time for the shut-off valve to reset.

Yet another feature of the present invention is the detent. The detent holds the piston in an open position until a force overcomes the detent. The detent preferably has a ball shaped head that mates with a groove in the piston. The detent exerts a resilient force on the shut-off piston and thereby holds it in the open position. When there is excessive fluid flow through the valve, the air/gas pressure from the pump increases and overcomes the resistance of the detent thereby triggering the shut-off piston to move to the closed position. In the preferred embodiment the detent mechanism includes a detent spring for resiliently forcing the detent against the piston. Also included is an adjustable compression bolt. The compression bolt allows a user to manually adjust the force the detent spring exerts on the detent. In this manner the shut-off valve is adjusted to trigger on different amounts of air/gas pressure.

Yet another feature of the present invention is the manual shut-off. The manual shut-off feature allows a user to manually shut-off fluid flow through the valve. For example, if a repair is needed on a machine, a user may want to shut-off the fluid supply while making the repair. The manual shut-off is accomplished by a trip arm attached to the detent. Pulling on the trip arm releases pressure from the detent and thereby releases the piston to move to the closed position.

Yet still another feature of the present invention is the reset mechanism. When the shut-off valve is closed there needs to be a way to reset the valve to the open position. The reset plunger accomplishes this task. The reset plunger is mounted on an opposing side of the valve body and in alignment with the piston. A portion of the plunger extends from the valve body. A user pushes the plunger into the valve body, the plunger engages the piston and pushes the piston back to the open position. The detent re-engages with the piston and the valve is again in the open position.

One of the advantages of the invention is reduced property damage. Using the invention reduces property damage when fluid is automatically shut-off. Damage is reduced to the machine, the building, and other equipment and items that may be damaged by fluid.

Another advantage is cost. Cost is reduced since expensive electronics and sensors are not required to manufacture the valve. Fluid cost is reduced by shutting off the fluid flow and thereby saving the cost of the otherwise wasted fluid.

Another advantage is time. The simple operation of the invention eliminates any learning curve to understand its operation. In addition, the invention is not affected by power outages or battery failures. There is no interruption in operation when there is a brief power outage. Electrically powered shut-off devices may require resetting in such instances.

Yet another advantage is that the invention is bi-directional. In other words it operates with fluid flow in either direction. This is an advantage in that it cannot be installed in the 'wrong' direction. It is also envisioned that there exist some applications where fluid flow in both directions is required. A shut-off valve that operates bi-directionally is an advantage in such a situation.

Therefore, goals of the invention include fluid damage prevention, ease of use, low cost, non-electric, safety, and reduced anxiety.

To address the goals stated above, the inventive fluid shut-off valve and method is provided. By solving the many difficulties associated with fluid leaks in homes, offices, factories and businesses the invention provides a cost effective way to address these problems for homeowners, engineers, maintenance staff, and owners around the world.

The invention is applicable to many fluid control applications whether in the home or industrial setting and is scalable to small and large applications.

Other objects, advantages, and features of the invention will become apparent upon consideration of the following detailed description, when taken in conjunction with the accompanying drawings. The above brief description sets forth rather broadly the more important features of the present disclosure so that the detailed description that follows may be better understood, and so that the present contributions to the art may be better appreciated. There are, of course, additional features of the disclosures that will be described hereinafter which will form the subject matter of the claims.

In this respect, before explaining the preferred embodiment of the disclosure in detail, it is to be understood that the disclosure is not limited in its application to the details of the construction and the arrangement set forth in the following description or illustrated in the drawings. The shut-off valve and method of the present disclosure is capable of other embodiments and of being practiced and carried out in various ways. Also, it is to be understood that the phraseology and terminology employed herein are for description and not limitation.

As such, those skilled in the art will appreciate that the conception, upon which this disclosure is based, may readily be used as a basis for designing other structures, methods, and systems for carrying out the several purposes of the present invention. It is important, therefore, that the claims are regarded as including such equivalent constructions as far as they do not depart from the spirit and scope of the present invention.

Further, the purpose of the Abstract is to enable the U.S. Patent and Trademark Office and the public generally, and especially the scientists, engineers, and practitioners in the art who are not familiar with the patent or legal terms of phraseology, to learn quickly, from a cursory inspection, the nature of the technical disclosure of the application. Accordingly, the Abstract is intended to define neither the invention nor the application, which is only measured by the claims, nor is it intended to be limiting as to the scope of the invention in any way.

These and other objects, along with the various features, methods, and structures that characterize the invention, are pointed out with particularity in the claims annexed to and forming a part of this disclosure. For a better understanding of the present disclosure, its advantages, and the specific objects attained by its uses, reference should be made to the accompanying drawings and descriptive matter in which there are illustrated and described the preferred embodiment of the invention.

As such, while embodiments of the automatic fluid shut-off valve and method are herein illustrated and described, it is to be appreciated that various changes, rearrangements and modifications may be made therein, without departing from the scope of the invention as defined by the claims.

BRIEF DESCRIPTION OF THE DRAWINGS

As a compliment to the description and for better understanding of the specification presented herein, six pages of drawings are disclosed with an informative, but not limiting, intention.

DETAILED DESCRIPTION OF THE PREFERRED EMBODIMENT

The best mode for carrying out the invention is presented in terms of the preferred embodiment. Similar referenced characters designate corresponding features throughout the several figures of the drawings.

Figure 1A:
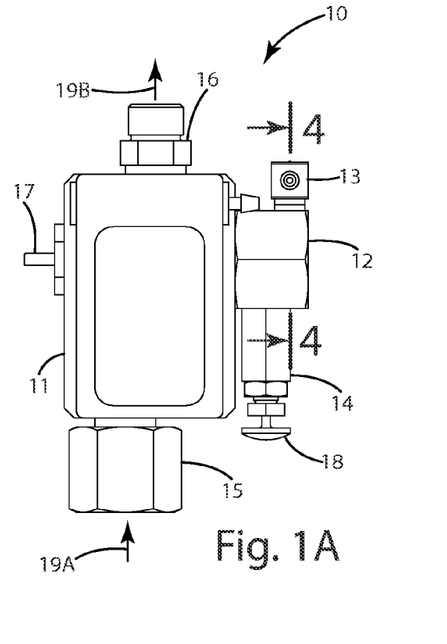
FIG. 1A is a front view of the preferred embodiment of the invention.

For purposes of description herein, the terms "left", "right", "top", and 'bottom" shall relate to the invention as oriented in FIG. 1A unless otherwise stated. However, it is to be understood that the invention may assume various alternative orientations, except where expressly specified to the contrary. It is also to be understood that the specific devices and methods illustrated in the attached drawings and described in the following specification are exemplary embodiments of the inventive concepts defined in the appended claims. Hence, specific dimensions and other physical characteristics relating to the embodiments disclosed herein are not to be considered as limiting, unless the claims expressly state otherwise.

Reference will now be made in detail to the present preferred embodiment of the invention, examples of which are illustrated in the accompanying drawings. Wherever possible, these same referenced numerals will be used throughout the drawings to refer to the same or like parts. Like features between the various embodiments utilize similar numerical designations. Where appropriate, the various similar features have been further differentiated by an alphanumeric designation, wherein the corresponding alphabetic designator has been changed. Further, the dimensions illustrated in the drawings (if provided) are included for purposes of example only and are not intended to limit the scope of the present invention.

Figure 1B:
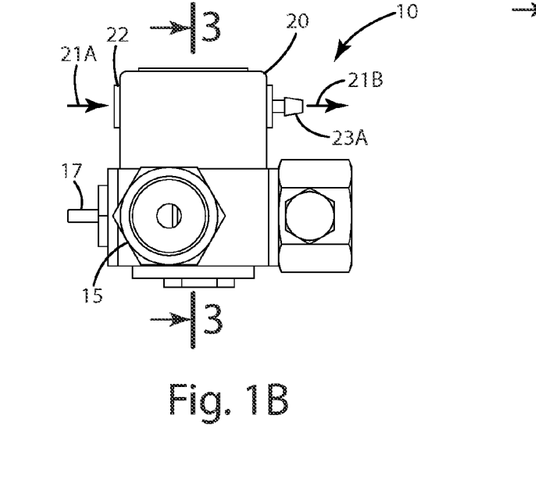
FIG. 1B is bottom view of the preferred embodiment.
Figure 1C:
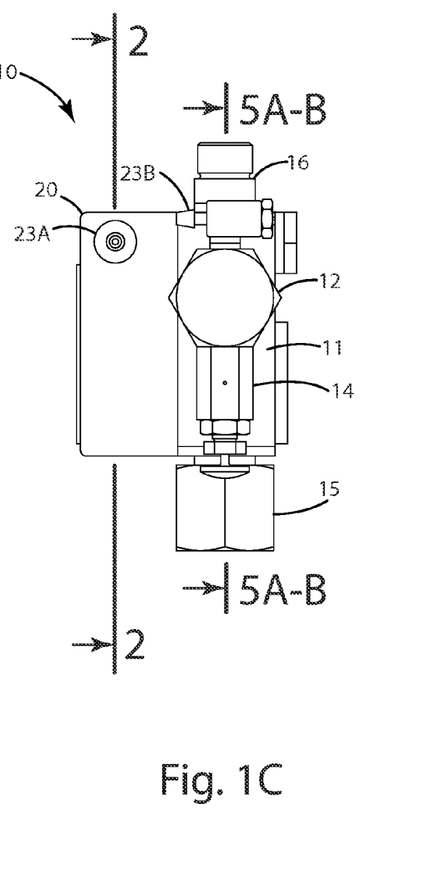
FIG. 1C is a side view of the preferred embodiment.

An exemplary embodiment of the invention is shown in FIGS. 1A, 1B and 1C. FIGS. 1A, 1B, and 1C show front, bottom, and side views respectively of invention. While the preferred embodiment is a consumer size shut-off valve for use in the home, the invention is not meant to be so limited. Those skilled in the art will understand that the invention may be scaled to other sizes. Large valves are envisioned for industrial applications and smaller sizes are envisioned for specialized applications. Those skilled in the art understand that the invention may be manufactured using a variety of materials including various metals and plastics. It is also understood that the shape and configuration of the invention may be changed while still practicing the spirit of the invention.

The components of the invention will first be briefly described and then described in detail. Referring to FIG. 1A, shut-off valve 10 is comprised valve body 11, piston housing 12, bleeder housing 13, detent housing 14, inlet fitting 15 and outlet fitting 16. Inlet fitting 15 and outlet fitting 16 are also referred to as fluid inlet 15 and fluid outlet 16. Also shown are reset plunger 17 and trip arm 18. Trip arm 18 allows a user to manually close valve 10. Reset plunger 17 allows a user to manually reset valve 10 to the open position after it is closed. Conventional fluid flow direction is shown with arrows 19a and 19b. While inlet fitting 15 and outlet fitting 16 are depicted as threaded fittings, it is understood that various other types of fluid couplings may be used.

Referring to FIG. 1B there is illustrated the bottom view of valve 10. Shown are pump housing 20, inlet check cap 22, pump outlet 23a, and air/gas flow indicated by arrows 21a and 21b. Air/gas is drawn into pump housing 20 as indicated by arrow 21a and air/gas exits pump housing 20 as indicated by arrow 21b. The term 'air/gas' is used in the specification to acknowledge that the pump portion of the invention can operate with a variety of gases. However, the preferred embodiment merely operates using the ambient air in the home, office, or factory.

Referring to FIG. 1C there is illustrated the side view of valve 10. Shown is bleeder inlet 23b. Pump outlet 23a and bleeder inlet 23b are in fluid communication with each other via a tube (not shown). Air/gas exits pump outlet 23a and enters bleeder inlet 23b.

Henceforth, one preferred embodiment will be described. However, this is merely for description and the size, proportions, indicia, and the like on shut-off valve 10 may be changed to suit the particular requirements of the application and the desires of the users.

Figure 2:
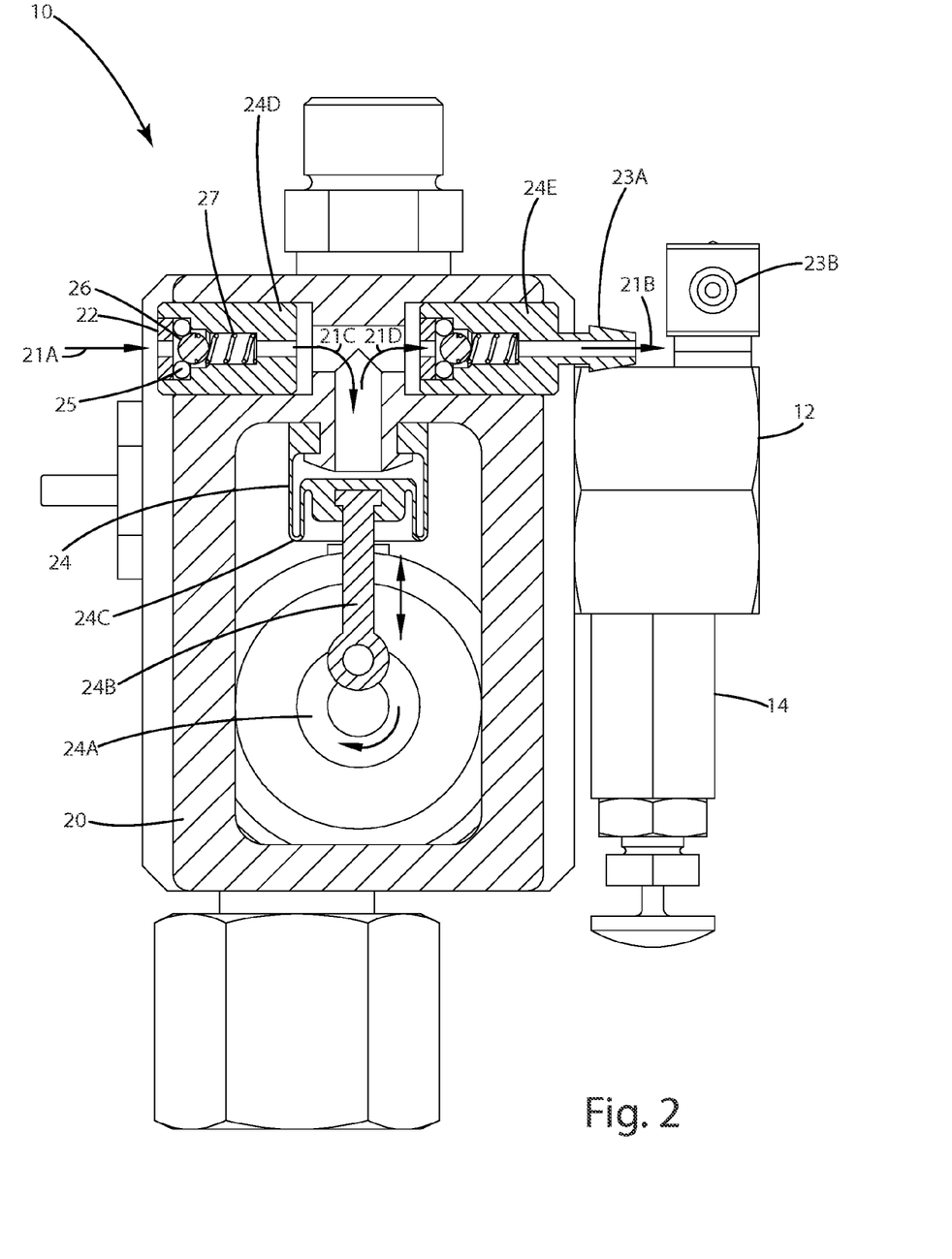
FIG. 2 shows a cross section view of FIG. 1C illustrating the pneumatic pump.

Referring now to FIG. 2, there is shown a cross section view of FIG. 1C illustrating the pneumatic pump function of the invention enclosed in pump housing 20. Pump 24 includes cam 24a, pump arm 24b, bellows 24c, inlet check valve 24d, and outlet check valve 24e. Air/gas flow is shown by arrows 21a, 21b, 21c, and 21d. When fluid flows through valve 10 in the direction of arrows 19, cam 24a rotates in a clockwise direction as indicated by the arrow on cam 21a. Pump arm 24b is attached to cam 24a offset from center such that pump arm 24b reciprocates. Pump arm 24b connects to bellows 24c causing movement and drawing in air/gas through inlet check valve 24d and exhausting air/gas through outlet check valve 24e. Operation of pumps are well known to those skilled in the art and need not be explained further. It is also understood that this is merely the preferred embodiment of a pump assembly and other implementations of pumps may also be adapted to work in the invention. It should be noted that only a low pressure needs to be generated by pump 24 to operate valve 10. In the preferred embodiment only a fraction of 1 psi (pounds per square inch) is needed to cause shut-off plunger 50 (described below) to move.

Still referring to FIG. 2, additional elements of the preferred embodiment are shown. Check valves 24d and 24e are of a conventional design. Inlet check valve 24d includes inlet check cap 22, inlet o-ring 25, inlet check ball 26, and inlet check spring 27. These function in a conventional manner known to those skilled in the art. Outlet check valve 24e is of the same design. Also shown are pump outlet 23a and bleeder inlet 23b. Air/gas that exits pump outlet 23a is delivered to bleeder inlet 23b through a tube (not shown).

Figure 3:
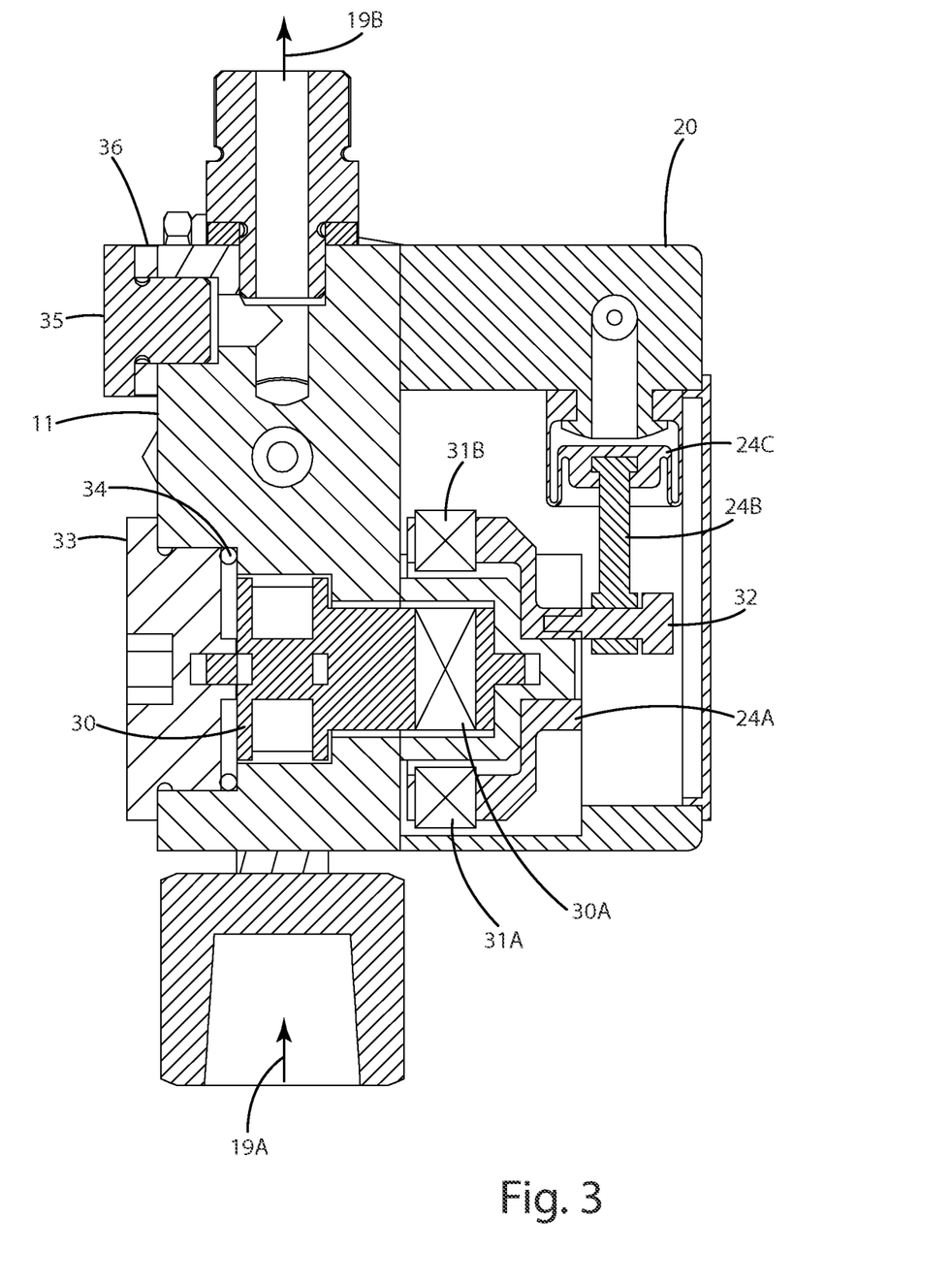
FIG. 3 shows a cross section view of FIG. 1B illustrating the magnetic coupling of the rotor and cam.

Referring now to FIG. 3, there is shown a cross section view of FIG. 1B illustrating the coupling between rotor 30 and cam 24a. Rotor 30 is a fluid flow meter mounted in valve body 11 and is in fluid communication with the fluid moving through valve 10. Rotor 30 rotates responsive to fluid flowing through valve 10. In the preferred embodiment rotor 30 and cam 24a are magnetically coupled. Rotor 30 includes at least one rotor magnet 30a that is preferably a permanent magnet. Cam 24a also includes at least one cam magnet 31a and 31b. Rotor magnet 30a and cam magnets 31 are separated by valve body 11 but are sufficiently close to each other to magnetically couple. Further, rotor magnet 30a and cam magnets 31 are sufficiently strong such that rotation of rotor magnet 30a causes cam 24a to rotate.

Cam arm 32 is offset from the center of cam 24a and is rotatably coupled to pump arm 24b. Pump arm 24b moves in a reciprocal motion responsive to rotation of cam 24a and actuates bellows 24c as discussed previously. Other element of the preferred embodiment include rotor shaft mount 33 and rotor shaft mount o-ring 34 for securing rotor 30 in valve body 11. Shaft mount 33 thread into valve body 11 and allows rotor 33 to move freely without contacting the valve body 11. Also shown are pump housing 20, alternate outlet plug 35, and outlet plug seal 36. It is envisioned that a mechanical coupling between rotor 30 and cam 24a would be an alternate embodiment.

Figure 4:
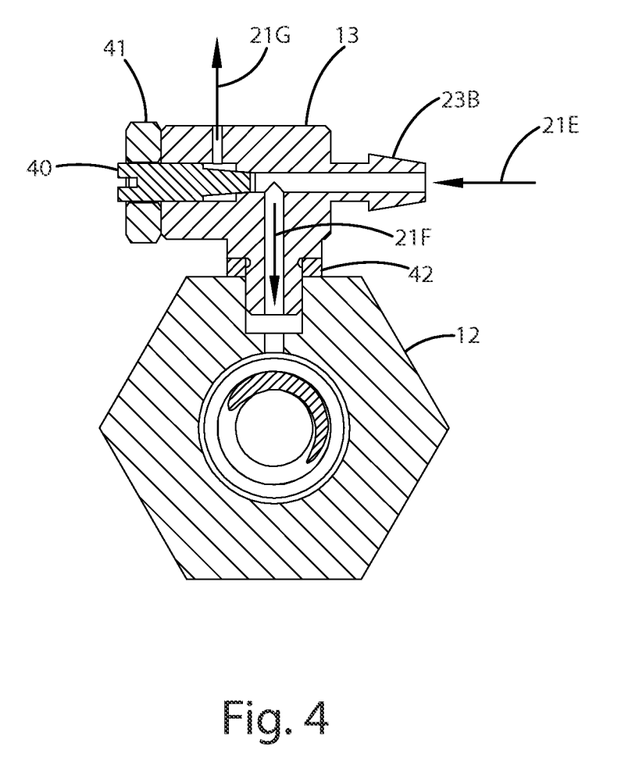
FIG. 4 is a cross section view of FIG. 1A illustrating the bleeder system.

Referring to FIG. 4, there is shown a cross section of FIG. 1A illustrating the bleeder portion of the invention. Shown are bleeder housing 13, bleeder inlet 23b, bleeder needle 40, and bleeder needle nut 41. Air/gas flows into bleeder housing through bleeder inlet 23b as shown by arrow 21e. Most of the air/gas flow moves into piston housing 12 as indicated by arrow 21f. A portion of the air/gas is vented from bleeder housing 13 through a vent as shown by arrow 21g. In the preferred embodiment the portion of air/gas that is vented is controlled by adjustable bleeder needle 40. Bleeder needles 40 are well known to those skilled in the art. It is also envisioned that the bleeder system could be of static design (i.e. none adjustable). The rate at which the air/gas is vented controls the time it takes to reset valve 10 to a static state.

Bleeder needle 40 is preferably adjustable so a user can adjust the air/gas venting for optimal operation. If the air/gas venting is either too large or too small, valve 10 may not function properly. For example, if air/gas is vented too rapidly, then valve 10 may never build up sufficient pressure to close. Consequently, a small fluid leak in an attached device (e.g. a washing machine) may not cause valve 10 to close and the small leak would continue. This would not be desirable. In the alternative, if air/gas is vented too slowly, then valve 10 may take too long to reset. Consequently, normal fluid flow demand from an attached device could cause valve 10 to close during normal operation when there is no fluid leak. This would cause inconvenience for a user. However, these are extreme examples and in a typical application preset factory settings would be satisfactory for many applications.

Figure 5A:
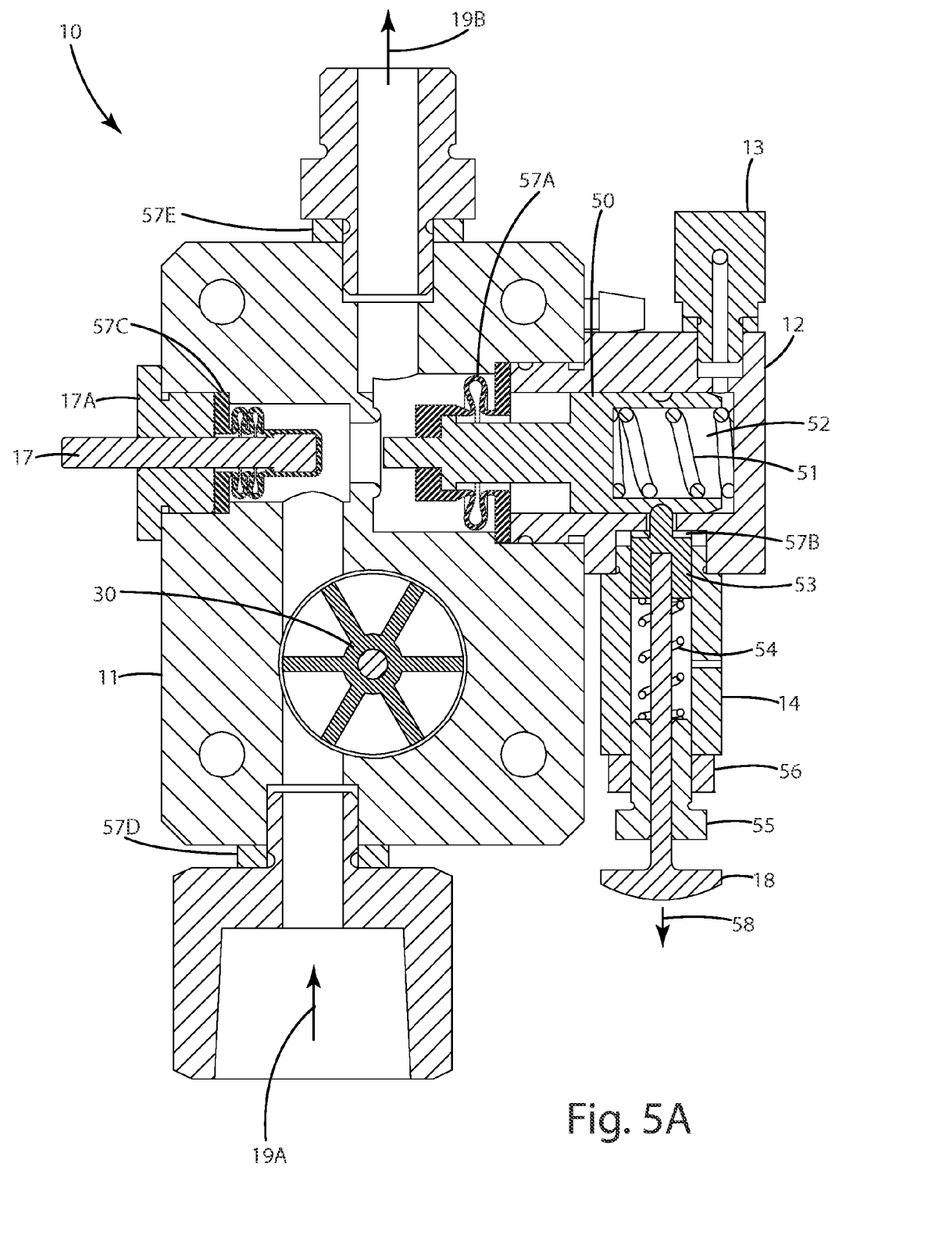
FIG. 5A is a cross section view of FIG. 1C illustrating the shut-off plunger in the open position.

Referring now to FIG. 5A, there is shown a cross section view of FIG. 1C illustrating the shut-off piston 50 of the invention in the open position. Also shown is a cross section view of detent housing 14. When piston 50 is in the open position fluid is able to flow through valve body 11 as indicated by arrows 19a and 19b. Piston 50 is held in the open position by detent 53. Piston spring 51 is compressed in piston chamber 52 and exerts force to urge piston 50 to the closed position (see FIG. 5B). Piston seal 57a is shown compressed.

In operation, fluid flows through valve body 11 causing rotor 30 to turn. As discuss previously, rotor 30 causes pneumatic pump 24 to operate and generate air/gas pressure in the closed system. Air/gas pressure is communicated to chamber 52 via bleeder housing 13 causing pressure in chamber 52 to increase. As fluid continues to flow through valve body 11, pump 24 continues to operate, and the pressure in chamber 52 continues to increase. If the fluid continues to flow the increased pressure in chamber 52 overcomes the resistance of detent 53. Piston spring 51 and the air/gas pressure cause piston 50 to move to the closed position thereby shutting off the fluid supply.

The detent function of the invention includes detent housing 14, detent 53, detent spring 54, spring compression bolt 55, and compression bolt lock nut 56. Detents are known to those skilled in the art and therefore will only be briefly described. Detent 53 preferably has a rounded head that seats into a groove in piston 50. Adjustable detent spring 54 exerts resilient force on detent 53. The force exerted by detent spring 54 is adjustable by spring compression bolt 55. Compression bolt lock nut 56 secures compression bolt 55 to the desired position. It is understood that other various detent mechanisms are know in the art and may also be used in the invention. It is also understood that a non-adjustable detent mechanism may be used. However, the preferred embodiment uses an adjustable mechanism.

The function of detent 53 is to hold piston 50 in the open position until a predetermined air/gas pressure builds in chamber 52. The air/gas pressure is responsive to fluid flow through valve 10. Therefore, by adjusting the force exerted on detent 53, shut-off valve 10 can be adjusted to shut-off responsive to a predefined amount of fluid flow through valve 10. If a greater quantity of fluid flow is needed, detent 53 is adjusted as follows. Compression bolt 55 is tightened causing detent spring 54 to compress and exert greater force on detent 53. The increased force has the result that greater air/gas pressure in chamber 52 is needed to overcome detent 53. Therefore, a greater quantity of fluid flow is required before piston 50 moves to the closed position. It should be appreciated that the invention operates on quantity of fluid flow and not just a large, but brief, fluid flow. Conversely, if it is desired to have the valve close responsive to a lesser quantity of fluid flow then compression bolt 55 may be loosened.

Several other aspects of valve 10 are shown in FIG. 5A. Trip arm 18 enables a user to manually turn off valve 10. Moving trip arm 18 in the direction of arrow 58 causes detent 18 to release piston 50 thereby closing valve 10. Also shown are several seals for blocking either fluid, air/gas, or both. Some of the many seals include piston seal 57a, detent seal 57b, reset seal 57c, inlet fitting seal 57d, and outlet fitting seal 57e. It is envisioned and understood that alternate embodiments of the invention can be implemented without the above listed seals. Some embodiments may eliminate the need for seals or alternatives to seals may be used such as permanently attached fittings, various thread sealants, and the like.

Figure 5B:
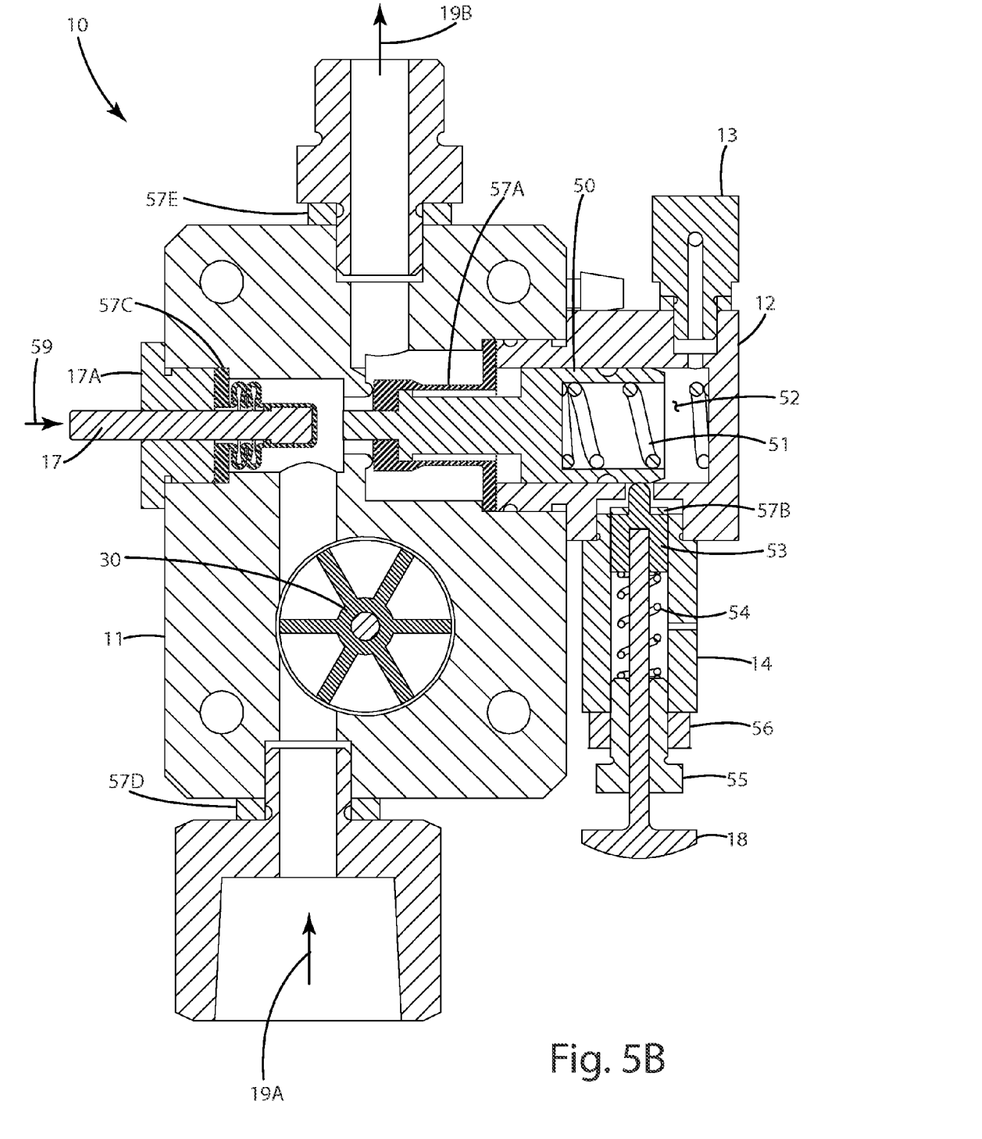
FIG. 5B is a cross section view of FIG. 1C illustrating the shut-off plunger in the closed position.

Referring to FIG. 5B, there is shown a cross section view of FIG. 1C illustrating the shut-off piston 50 of the invention in the closed position. Piston 50 is shown in the closed position. Piston seal 57a is now extended and the left side (as viewed in FIG. 5B) of piston seal 57a is in contact with valve body 11 thereby blocking the fluid channel through valve 10. Fluid flow indicated by arrows 19a and 19b is halted. There are two ways valve 10 may be put in the closed state. One way is if trip arm 18 is manually retracted as discussed above. The other way is if fluid flow through valve 10 is sufficient to cause air/gas pressure in chamber 52 to increase to a predetermined level and overcome detent 53. The preferred embodiment requires less than 1 psi of air/gas pressure to overcome detent 53. It is envisioned that some embodiments will require less than ¼ psi to overcome detent 53. However, it is understood that some embodiments may require more than 1 psi. For example, large scale implementations of the invention.

Also illustrated is reset plunger 17. The purpose of reset plunger 17 is to reset a closed valve 10 to the open position. A user pushes plunger 17 into valve body 11 as shown by arrow 59 causing plunger 17 to contact piston 50. Plunger 17 is pushed further until piston 50 is moved to the open position and is held open by detent 53. Also shown is reset mount 17a.

The method of the invention follows from the description of the apparatus above. The method of shutting off fluid flow in a supply line comprise the steps of:
  Providing a valve having a fluid inlet and a fluid outlet;
  Connecting said fluid inlet to said supply line;
  Providing a rotor positioned inside said valve and rotating responsive to said fluid flow;
  Providing a pneumatic pump operating responsive to rotation of said rotor and creating increased air/gas pressure;
  Providing a shut-off piston in fluid communication with said pump and wherein said shut-off piston moves to a closed position responsive to said increased air/gas pressure.
  Providing a detent in contact with said shut-off piston and exerting sufficient force on said detent to hold said piston in an open position;
  Providing a bleeder valve in fluid communication with said pump and venting a portion of said air/gas;
  Providing a reset plunger and exerting force on said rest plunger to move said shut-off piston to an open position;
  Wherein said rotor is magnetically coupled to said pump;
  Replacing the step of moving said shut-off valve with the step of providing a trip arm and moving said trip arm to release force on said detent;
  Wherein said shut-off piston moves to a closed position responsive to an increase of said air/gas pressure of less than 1 psi;
  Wherein said shut-off piston moves to a closed position responsive to an increase of said air/gas pressure of less than 0.25 psi.

Those skilled in the art understand that these examples are illustrative of the invention and that many other configurations of fittings, rotors, pumps, bleeder valves, detents, pistons, and plunger designs can be extrapolated from these descriptions.

These descriptions illustrate the advantages of the invention. For example, the simple mechanical and pneumatic design that requires no electricity or circuits. The magnet coupling that improves reliability. There is also the advantage that valve 10 is simple to operate and is adjustable to various fluid demand applications. The improvement in safety and the reduced damage costs are also significant advantages. Finally, the advantage of reducing frustrating and anxiety are advantages of the invention.

The specific configurations and features of the invention may vary according to specific requirements. In the preferred embodiment, the invention is generally used in consumer applications in the home. However, the invention is also useful in offices, businesses, and factories. Further, although only a few embodiments of the invention have been illustrated, it is understood that many adaptations of the invention may be implemented without departing from the spirit of the invention.

The solutions offered by the invention disclosed herein have thus been attained in an economical, practical, and facile manner. To whit, a novel automatic shut-off valve and method which is cost effective, easily adapted to most types of fluid delivery systems, and quickly understood and appreciated by users has been invented. While a preferred embodiment and example configurations of the inventions have been herein illustrated, shown, and described, it is to be appreciated that various changes, rearrangements, and modifications may be made therein, without departing from the scope of the invention as defined by the claims. It is intended that the specific embodiments and configurations disclosed herein are illustrative of the preferred and best modes for practicing the invention, and should not be interpreted as limitations on the scope of the invention as defined by the claims, and it is to be appreciated that various changes, rearrangements, and modifications may be made therein, without departing from the scope of the invention as defined by the claims.

The invention claimed is:

1. An automatic water shut-off valve comprising:
  a valve housing having,
  an inlet fitting, and,
  an outlet fitting;
  a rotor attached to said valve housing between said inlet fitting and said outlet fitting and rotating responsive to fluid flow through said valve housing;
    a cam coupled to said rotor and moving responsive to rotation of said rotor;
    a pump arm coupled to said cam;
    a bellows connected to said pump arm and pumping air;
    a shut-off piston moveably mounted in said valve housing and in fluid communication with said inlet fitting and said outlet fitting, said piston in fluid communication with said bellows and movable to a closed position responsive to air from said bellows.

2. The automatic water shut-off valve according to claim 1 further comprising,
  a detent moveably attached to said valve housing and mechanically holding said piston in an open position.

3. The automatic water shut-off valve according to claim 2 further comprising,
  a bleeder housing mechanically attached to said valve housing and in fluid communication with said bellows and said piston, said bleeder housing having,
  a bleeder inlet in fluid communication with said bellows, and,
  a bleeder needle mounted in said bleeder housing and modulating air vented from said bleeder housing.

4. The automatic water shut-off valve according to claim 3 wherein said bleeder needle is adjustable.

5. The automatic water shut-off valve according to claim 4 wherein said cam is mechanically coupled to said rotor.

6. The automatic water shut-off valve according to claim 4 further comprising,
  a rotor magnet mounted on said rotor,
  a cam magnet mounted on said cam; and, wherein said rotor magnet and cam magnet are magnetically coupled such that rotary motion of said rotor induces motion in said cam.

7. The automatic water shut-off valve according to claim 6 further comprising,
a detent spring in contact with said detent; and,
a detent spring compression bolt in contact with said detent spring.

8. The automatic water shut-off valve according to claim 7 further comprising,
a detent trip arm mechanically coupled to said detent such that a user can retract said detent from said piston.

9. The automatic water shut-off valve according to claim 8 further comprising,
a reset plunger movably attached to said valve body and aligned with said shut-off piston, said plunger suitable for moving said piston to an open position.

10. An automatic fluid shut-off device for shutting off fluid flow in a fluid supply line comprising:
a valve body having,
a fluid inlet connected to said fluid supply line, and,
a fluid outlet for connecting to a fluid distribution line;
a rotor attached to said valve body and rotating responsive to fluid flow through said valve body;
a shut-off piston moveably attached to said valve body and in fluid communication with said fluid inlet and said fluid outlet; and,
a pump coupled to said rotor and in fluid communication with said shut-off piston.

11. The automatic fluid shut-off device according to claim 10 further comprising,
a rotor magnet attached to said rotor; and,
wherein said pump includes a cam, said cam having a cam magnet magnetically coupled with said rotor magnet such that said cam moves responsive to movement of said rotor magnet.

12. The automatic fluid shut-off device according to claim 11 further comprising a bleeder needle mechanically secured to said valve body and in fluid communication with said pump.

13. The automatic fluid shut-off device according to claim 12 further comprising a detent in contact with said shut-off piston.

14. The automatic fluid shut-off device according to claim 13 further comprising,
a detent spring exerting resilient force on said detent; and,
a detent spring compressor bolt applying pressure on said detent spring.

15. The automatic fluid shut-off device according to claim 14 further comprising a trip arm mechanically coupled to said detent.

16. The automatic fluid shut-off device according to claim 15 further comprising a reset plunger moveably mounted to said valve body and suitable for moving said shut-off piston to an open position.

17. The automatic fluid shut-off device according to claim 16 wherein said pump causes increased air/gas pressure and said piston moves to a closed position responsive to said air/gas pressure.

18. The automatic fluid shut-off device according to claim 17 wherein said piston moves to a closed position responsive to an air/gas pressure increase of less than 1 psi.

19. The automatic fluid shut-off device according to claim 18 wherein said piston moves to a closed position responsive to an air/gas pressure increase of less than 0.25 psi.

20. An automatic fluid shut-off apparatus for shutting off fluid flow between a fluid supply line and a fluid distribution line comprising:
an inlet fitting coupled to said fluid supply line;
an outlet fitting coupled to said fluid distribution line and in fluid communication with said inlet fitting;
a flow meter between said inlet fitting and said outlet fitting and in fluid communication with said inlet fitting;
a pneumatic pump coupled to said flow meter; and,
a shut-off piston in fluid communication with said pump.

21. The automatic fluid shut-off apparatus according to claim 20 further comprising a bleeder apparatus in fluid communication with said pump.

22. The automatic fluid shut-off apparatus according to claim 21 further comprising a detent in contact with said shut-off piston.

23. The automatic fluid shut-off apparatus according to claim 22 further comprising a reset plunger coupled to said piston.

24. The automatic fluid shut-off apparatus according to claim 23 further comprising a trip arm coupled to said detent.

25. The automatic fluid shut-off apparatus according to claim 20 wherein said pump pumps air/gas responsive to fluid flow through between said inlet fitting and said outlet fitting.

26. The automatic fluid shut-off apparatus according to claim 25 wherein said piston moves to a closed position responsive said air/gas from said pump.

27. The automatic fluid shut-off apparatus according to claim 26 wherein said piston moves to a closed position responsive to a predetermined air/gas pressure from said pump.

28. The automatic fluid shut-off apparatus according to claim 27 wherein said piston moves to a closed position responsive to an increased air/gas pressure of less than 1 psi.

29. The automatic fluid shut-off apparatus according to claim 28 wherein said piston moves to a closed position responsive to an increased air/gas pressure of less than 0.25 psi.

30. A method of automatically shutting off fluid flow in a fluid supply line responsive to excessive fluid flow comprising the steps of:
providing a valve having a fluid inlet and a fluid outlet;
connecting said fluid inlet to said supply line;
providing a rotor positioned inside said valve and rotating responsive to fluid flow through said valve;
providing a pneumatic pump operating responsive to rotation of said rotor and creating increased air/gas pressure;
providing a shut-off piston in fluid communication with said pump; and
wherein said shut-off piston moves to a closed position responsive to said increased air/gas pressure.

31. The method of automatically shutting off fluid flow according to claim 30 further comprising the step of providing a bleeder valve in fluid communication with said pump and venting a portion of said air/gas.

32. The method of automatically shutting off fluid flow according to claim 31, further comprising the step of providing a detent in contact with said shut-off piston and exerting sufficient force on said detent to hold said piston in an open position.

33. The method of automatically shutting off fluid flow according to claim 32 wherein said rotor is magnetically coupled to said pump.

34. The method of automatically shutting off fluid flow according to claim 33, further comprising the step of providing a reset plunger and exerting force on said rest plunger to move said shut-off piston to an open position.

35. The method of automatically shutting off fluid flow according to claim 33, further comprising the step of providing a trip arm and moving said trip arm to release force on said detent.

36. The method of automatically shutting off fluid flow according to claim 35 wherein said shut-off piston moves to a closed position responsive to an increase of said air/gas pressure of less than 1 psi.

37. The method of automatically shutting off fluid flow according to claim 36 wherein said shut-off piston moves to a closed position responsive to an increase of said air/gas pressure of less than 0.25 psi.

* * * * *